US006294848B1

(12) United States Patent
Goodrich, II

(10) Patent No.: US 6,294,848 B1
(45) Date of Patent: Sep. 25, 2001

(54) DISTRIBUTED POWER SUPPLY FOR HOT SWAPPABLE BACKPLANE

(75) Inventor: Earl Goodrich, II, Lansing, MI (US)

(73) Assignee: Sprint Communications Company, L.P., Kansas City, MO (US)

( * ) Notice: Subject to any disclaimer, the term of this patent is extended or adjusted under 35 U.S.C. 154(b) by 0 days.

(21) Appl. No.: 09/689,365

(22) Filed: Oct. 12, 2000

(51) Int. Cl.[7] ............... H01B 7/30; H01J 13/00; H02M 3/00
(52) U.S. Cl. ............... 307/147; 395/280; 363/15
(58) Field of Search ............... 363/15, 16, 20, 363/21.01, 21.04, 95, 97, 131, 144, 147; 323/205, 207, 208; 307/42, 147; 395/280–284

(56) References Cited

U.S. PATENT DOCUMENTS

| | | | |
|---|---|---|---|
| 4,922,449 | * 5/1990 | Donaldson et al. | 364/900 |
| 5,530,302 | * 6/1996 | Hamre et al. | 307/147 |
| 5,881,142 | 3/1999 | Frankel et al. | 379/167 |
| 5,909,065 | * 6/1999 | Jones et al. | 307/147 |
| 5,963,620 | 10/1999 | Frankel et al. | 379/93.05 |
| 6,075,784 | 6/2000 | Frankel et al. | 370/356 |
| 6,141,339 | 10/2000 | Kaplan et al. | 370/352 |
| 6,201,721 | * 3/2001 | Suranyi et al. | 363/144 |

OTHER PUBLICATIONS

U.S. application No. 09/197,044, Way et al., filed Nov. 20, 1998.
U.S. application No. 09/226,575, Rush et al., filed Jan. 7, 1999.
U.S. application No. 09/650,985, Kaplan et al., filed Aug. 30, 2000.
U.S. application No. 09/650,560, Kaplan et al., filed Aug. 30, 2000.
U.S. application No. 09/653,105, Dale et al., filed Aug. 31, 2000.
U.S. application No. 09/675,585, Goodrich, II, filed Sep. 29, 2000.
Linear Technology Corporation Data Sheet, LT 1373, 250kHz Low Supply Current High Efficiency 1.5A Switching Regulator, 1995, pp. 1–12.
Linear Technology Corporation Data Sheet, LTC 1421, Hot Swap Controller, 1996, pp. 1–24.

* cited by examiner

Primary Examiner—Matthew Nguyen
(74) Attorney, Agent, or Firm—Harley R. Ball

(57) ABSTRACT

The present invention discloses a power distribution system for circuit boards connected to a backplane in a customer premises telecommunications hub. Each functional board in the system contains its own DC to DC converter for receiving a first DC supply voltage from the backplane and supplying a lower voltage to the circuits on the board. The converter is of the single ended primary inductance converter type having its inductance element positioned between the power switching device and the input power capacitor. The power converter is connected to the main power supply through two pins of a staged or staggered connector on the board. A resistor is connected between the earlier of the two pins to make contact with the main supply. Due to the small size of the input resistor required for the converter, the input capacitor can almost fully charge before the second pin, which connects directly to the converter input, makes contact.

10 Claims, 2 Drawing Sheets

DISTRIBUTED POWER SUPPLY FOR HOT SWAPPABLE BACKPLANE

FIELD OF THE INVENTION

The present invention relates to power supplies for telecommunications hubs, and more particularly to a distributed power supply which permits hot swapping of circuit boards connected to a backplane in a customer premises telecommunications hub.

BACKGROUND OF THE INVENTION

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carrier's ATM over ADSL (asymmetric digital subscriber line) traffic to a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in co-pending U.S. patent application Ser. No. 09/226,575 entitled "Multi-Services Communications Device," filed on Jan. 7, 1999 (Sprint docket number 1246), which is incorporated by reference herein in its entirety. The network interface typically is a broad band network interface such as ADSL, T1, or HDSL-2. Examples of user interfaces include telephone interfaces such as plain old telephone system (POTS) ports for connecting telephones, fax machines, modems, and the like to the ISH; computer interfaces such as ethernet ports for connecting computers and local area networks to the ISH; and video ports such as RCA jacks for connecting video players, recorders, monitors, and the like to the ISH.

In providing telephony services over a broadband network, the ISH connects a telephone in the customer's premises to a network element such as a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring current, ringback, and busy signals. The terms off-hook and off-hook condition as used herein are generic terms meaning that a user device (whether telephone, facsimile machine, modem, etc.) connected to a telephone line is attempting to access and use the line.

The numerous functions which must be performed by the ISH are handled by a number of different circuits physically located on a number of circuit boards plugged into a backplane. A backplane is itself a printed circuit board with a number of sockets for receiving the other circuit boards which make up the ISH. One board carries a power converter which receives AC power from the local power grid and provides a DC voltage, typically 12 volts, to the backplane. Each of the other cards plugged in to the backplane receives this DC voltage and uses it to power circuitry carried on the boards. Most of the circuits used in telecommunication applications require lower voltages to operate, typically 5 volts and 3.3 volts. Although these other voltages may be provided by the power supply and connected to the backplane for connection to the other cards, a number of problems have been recognized with this approach. The additional power supply rails in the backplane use more of the available spaces in the backplane sockets, increase resistive losses and increase system noise. The lower voltages require close regulation. Each of the low voltage supplies must be overdesigned since it is not necessarily known in advance how much power the functional cards will require.

Use of a distributed power arrangement avoids these problems. In a distributed power system, the main power supply provides only one relatively high voltage level, typically 12 to 48 volts, to the backplane. The lower voltages are provided by power converters on each card. This helps reduce system noise by isolating functional blocks and allows for failure isolation. Each converter can be optimally sized for the functional circuitry on its own circuit board. The main power supply need not be closely regulated, since the distributed converters provide control on each board.

Power converters located on the functional cards, however, cause a problem with hot swapping, i.e. plugging in cards while the power is on. This is a particular concern in equipment intended for installation on customer premises, because the customer may add or replace boards without first turning off the power to the system.

SUMMARY OF THE INVENTION

The power supply of the present invention uses simple circuitry to provide hot swappable distributed power for a telecommunications hub suitable for installation at a customer premises. In particular, the present invention eliminates the requirement for active control of current upon plugging a board into the backplane. A power converter of the present invention is of the single ended primary inductance converter ("SEPIC") type having an inductance between the switch device and the input power line and a relatively small input capacitor. Input power is connected to the converter through two staged or staggered connector pins. A resistor is connected between an early contact pin and the converter input. A later or delayed contact pin is connected directly to the converter input. The resistor limits startup current to a safe level and the small input capacitor is essentially fully charged before the later pin makes contact.

DESCRIPTION OF AN EMBODIMENT OF THE INVENTION

Figure 1:
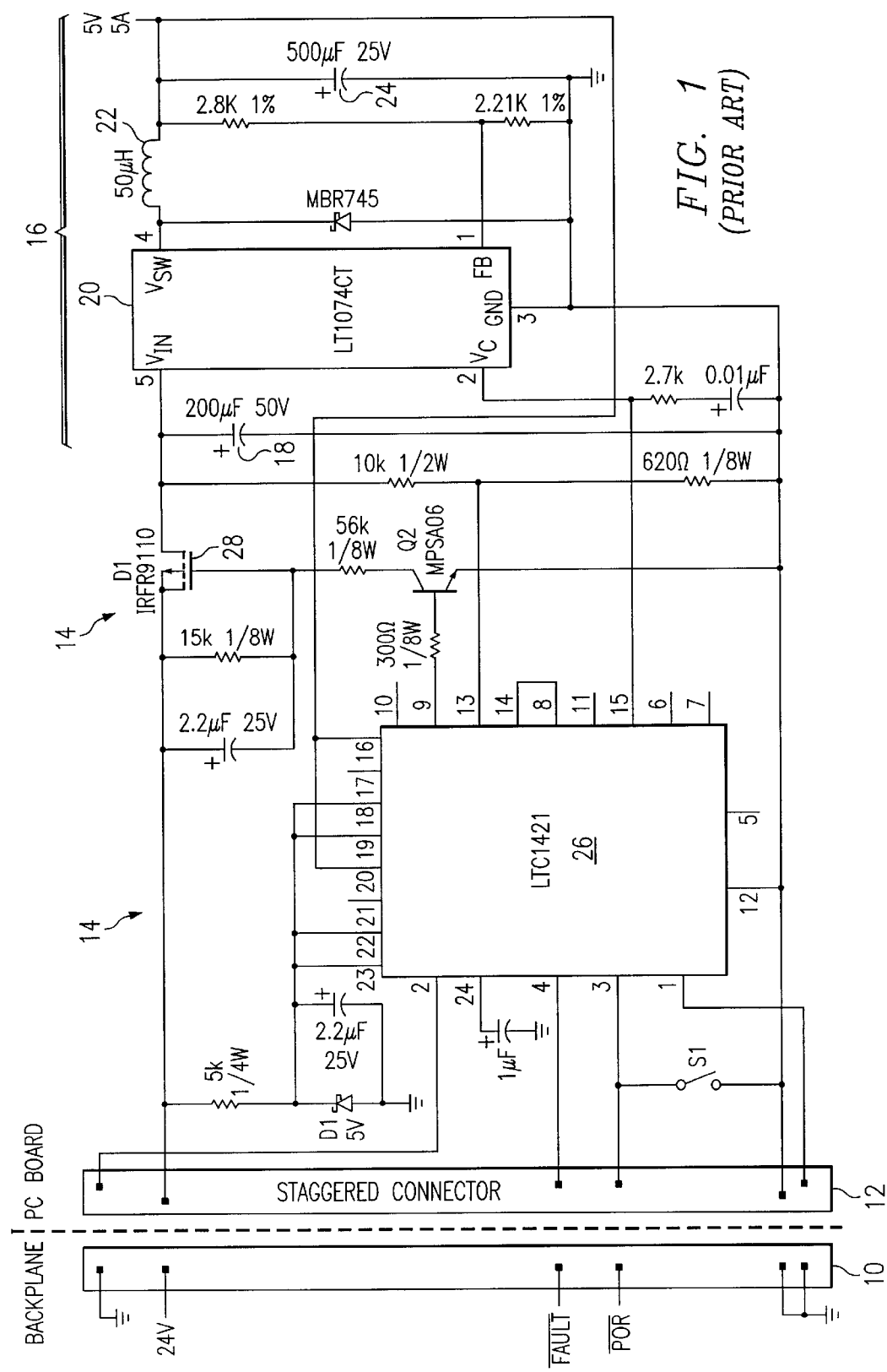
FIG. 1 is a schematic diagram of a prior art power converter having active hot swapping input current protection.

FIG. 1, shows a prior art hot swappable power supply. In FIG. 1, a backplane 10 is shown through which power and other signals are connected to various circuit boards. A staggered connector 12 is located on a printed circuit board which connects to backplane 10. The printed circuit board carries a power converter circuit shown generally at 14 and including all of the circuitry illustrated in FIG. 1. As illustrated, converter 14 receives 24 volts at its connection to the backplane and provides 5 volts at its output for powering the functional circuitry on the remainder of the board which is not shown. The conversion of power from 24 to 5 volts is performed by the circuitry labeled 16. A large input capacitor 18 charges to the input 24 volt level. This input voltage is switched by voltage controller 20 through inductor 22 to maintain the desired 5 volt output on capacitor 24.

If the power converter 16 were to be plugged directly into the backplane while the 24 volt supply was active and capacitor 18 was discharged, very high instantaneous currents would occur while capacitor 18 was charged. This current could damage the pins in connector 12 as they make contact or damage other portions of the circuitry. The current can also cause a momentary drop in the 24 volt supply which can cause damage to, or at least disturb the operation of, other functional circuits which are connected to the same supply. The remaining circuitry shown in FIG. 1 is provided to prevent these problems. Controller 26 drives transistor 28 to limit the startup flow of current into capacitor 18 to acceptable levels.

Figure 2:
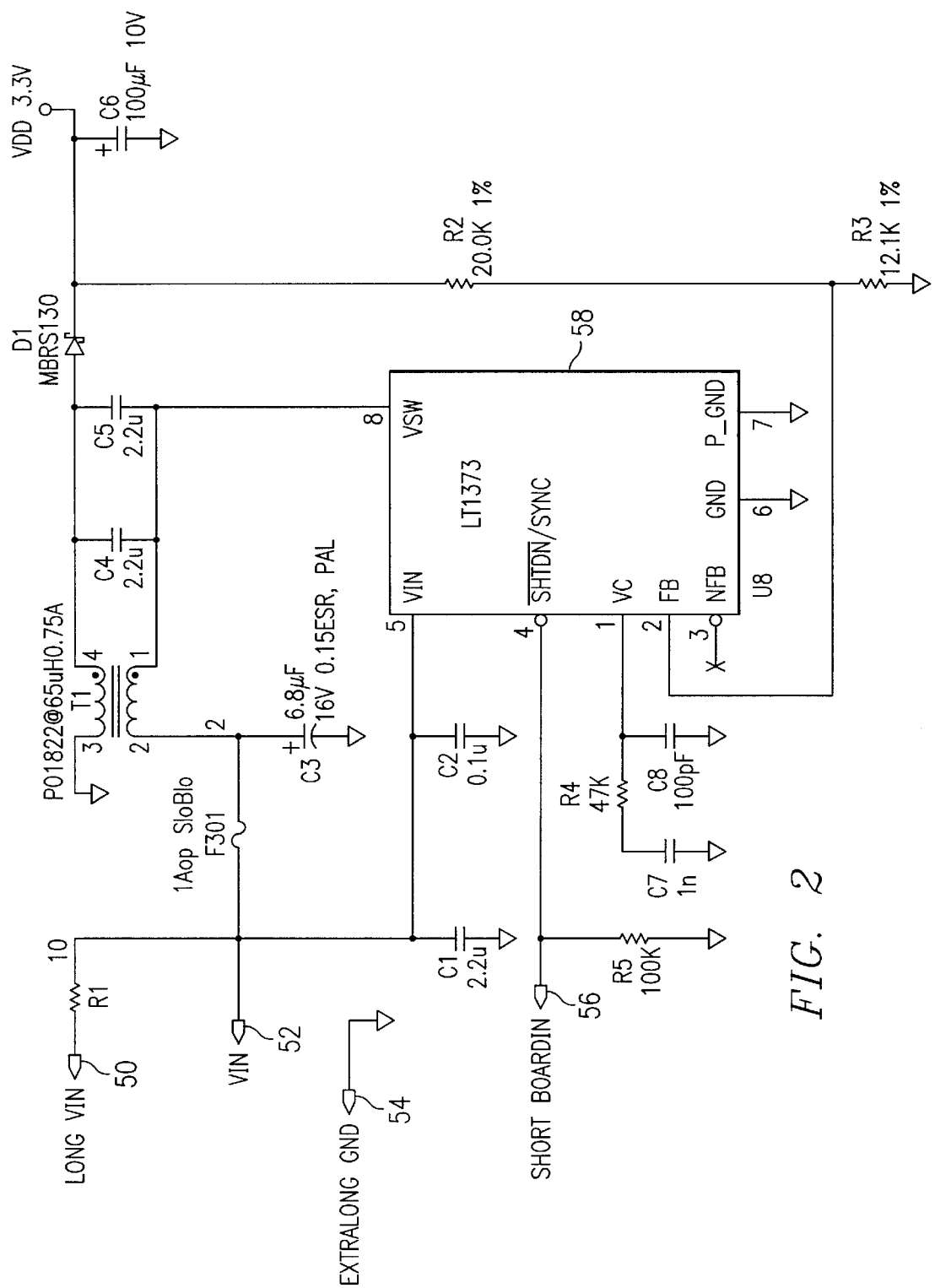
FIG. 2 is a schematic diagram of a hot swappable power converter in accordance with the present invention.

With reference to FIG. 2, a distributed voltage converter according to the present invention will be described. A staggered or staged connector is used in the present invention. Pins 50, 52, 54 and 56 are part of that connector and are illustrated in their relative positions to show the contact or make up sequence. Pin 54 is the longest, labeled extra long, and therefore makes contact first. Pin 54 establishes the ground connection. Pin 50, labeled long, is shorter than pin 54 and makes a first contact to the supply voltage. Pin 52 is shorter than pin 50 and makes a second contact to the supply voltage. Pin 56 is the shortest of the four pins and makes the last contact which signals that the board is completely installed or plugged in.

As the circuit board with the FIG. 2 circuitry is plugged partly into the backplane socket, pin 50 makes an early contact to connect the input power through resistor R1, 10 ohms, and fuse F301 to an capacitors C1, C2 and C3, totaling 9.1 $\mu$F. When the board is inserted further into the backplane socket, pin 52 makes a delayed contact, relative to pin 50, and connects input power through only fuse F301 to capacitors C1, C2 and C3.

The input voltage is switched through one winding of inductive transformer T1 by pulse width modulated voltage controller 58. The secondary winding of T1, capacitors C4 and C5, and diode D1 convert the pulse width modulated current pulses generated by controller 58 into the output voltage VDD on capacitor C6. Resistor divider R2 and R3 provides a feedback signal from VDD to the feedback input of controller 58. Resistor R4 and capacitors C7, 1 $\mu$F, and C8, 100 pF provide loop frequency compensation. Resistor R5 holds the shutdown and synchronization input of controller 58 low until pin 56 makes contact when the board is fully inserted into the backplane socket. The connection from pin 56 provides a high logic level to the shutdown and synchronization input of controller 58, as well as other components on the board, indicating that the board is plugged in and it should start operating.

A comparison of the circuits of FIG. 1 and FIG. 2 shows some of the advantages of the present invention. The prior art circuit requires an input capacitor of 200 $\mu$F while the present invention only uses a total input capacitance of 9.1 $\mu$F. As a result, the total charge required to charge up the input capacitance of the present invention is considerably less. This allows the use of the simple 10 ohm resistor R1 to limit current instead of the complicated hot swapping control circuitry illustrated in FIG. 1. In the present invention a maximum safe first contact pin current was determined to be 1.5 amperes. The usual supply voltage is 12 to 14 volts. The ten ohm resistor therefore limits input current below the maximum safe current. With the values of this resistor and the input capacitance, several charge time constants occur in less than one millisecond. This is considerable less than the pin staging time, i.e. the time between pins 50 and 52 making contact. As a result, the input capacitance will be charged almost fully before pin 52 makes contact.

The use of the small input capacitor is made possible by use of single ended primary inductance converter. The input inductance, transformer T1, is positioned between the current switching device 58 and the input capacitance. As a result, the instantaneous currents which need to be drawn from the input capacitor are reduced and the usual square wave current pulses are replaced by a sawtooth waveform.

This is why the input capacitor can be considerably smaller than is required in prior art systems while still presenting minimal switching noise back to the power source. While a specific converter circuit has been illustrated, any variation thereof, which provides the input inductance between the input capacitor and the current switching device, would also work because it would allow a relatively small input capacitor.

The use of this type of power converter also has a safety advantage over the prior art. It has no direct path from the input power supply to the output voltage line. The most common failure in power converters is for the power switching device to short circuit. If that happens in a circuit like the one shown in FIG. 1, the input voltage would be connected directly to the output. That would result in 24 volts instead of 5 volts being supplied to the functional circuits, which would probably destroy them. Failure of the switching device in the present invention, either short or open circuit failure, will not connect the high voltage supply to the low voltage output While the present invention has been illustrated and described with reference to specific circuits and methods of operation, it is clear that various modifications thereof and substitution of parts may be made within the scope of the invention as defined by the appended claims.

What is claimed is:

1. A power distribution system for supplying power to circuit boards connected to a backplane in a customer premises telecommunications hub comprising:
    a DC power source connected to the backplane and providing DC power at a first DC voltage;
    a circuit board having staged pins for connection to said backplane;
    a single ended primary inductance DC to DC converter on said circuit board having an input for receiving said first DC voltage and an output for providing a second DC voltage lower than said first DC voltage, said input coupled through a resistor to an early contact pin for receiving said first voltage and coupled directly to a delayed contact pin for receiving said first voltage.

2. The system of claim 1, wherein an input capacitor is coupled to said converter input and the value of said resistor is selected to limit current into said input capacitor to a safe level.

3. A power converter on a hot swappable circuit board to be plugged into a backplane socket providing a first DC voltage in a customer premises telecommunications hub comprising:
    a single ended primary inductance DC to DC converter having an input for receiving said first DC voltage and an output for providing a second DC voltage, and
    staged pins for connection to said backplane socket,
    said input coupled through a resistor to an early contact pin for receiving said first DC voltage and coupled directly to a delayed contact pin for receiving said first DC voltage.

4. The system of claim 3, wherein an input capacitor is coupled to said converter input and the value of said resistor is selected to limit current into said input capacitor to a safe level.

5. A power converter according to claim 3, wherein said second DC voltage is lower than said first DC voltage.

6. A circuit board carrying functional circuits for a customer premises telecommunications hub, said hub having a backplane connector for receiving said circuit board and providing a connection to a first DC voltage, said circuit board including a power converter comprising:
    a single ended primary inductance DC to DC converter having an input for receiving said first DC voltage and an output for providing a second DC voltage, and
    staged pins for connection to said backplane connector,
    said input coupled through a resistor to an early contact pin for receiving said first DC voltage and coupled directly to a delayed contact pin for receiving said first DC voltage.

7. A power converter according to claim 6, wherein said second DC voltage is lower than said first DC voltage.

8. A power conversion system for hot swappable circuitry comprising:
    a connector having a plurality of staged pins;
    a single ended primary inductance DC to DC converter coupled to said connector having an input for receiving a first DC voltage;
    wherein said input of said converter is coupled through a resistor to an early contact pin of said connector and is coupled directly to a delayed contact pin of said connector.

9. The system of claim 8, wherein an input capacitor is coupled to said converter input and the value of said resistor is selected to limit current into said input capacitor to a safe level.

10. The system of claim 8 further including:
    a customer premises telecommunications hub having a backplane including a socket for receiving the connector; and,
    a DC power supply connected to said backplane socket.

* * * * *